United States Patent Office 3,600,439
Patented Aug. 17, 1971

3,600,439
PROCESS FOR THE PREPARATION OF A MIXTURE OF N - CHLOROCARBONYL-ISOCYANIDE DICHLORIDE AND CARBONYL-BIS - (N-ISOCYANIDE DICHLORIDE)
Hermann Hagemann, Cologne-Flittard, Germany, assignor to Farbenfabriken Bayer Aktiengesellschaft, Leverkusen, Germany
No Drawing. Filed May 22, 1968, Ser. No. 731,284
Claims priority, application Germany, Aug. 30, 1967, F 53,353
Int. Cl. C07c 127/00
U.S. Cl. 260—544                                              9 Claims

ABSTRACT OF THE DISCLOSURE

Preparation of a mixture of N-chlorocarbonylisocyanide dichloride and carbonyl-bis-(N-isocyanide dichloride) or the corresponding thio compounds, by reacting cyanogen chloride in the absence of Lewis acids with phosgene or thiophosgene, e.g. at a temperature of 100–300° C., under elevated pressure, e.g. 5–100 atmospheres excess pressure, in the presence of active charcoal, optionally in the presence of an inert gas and/or inert solvent, the mixture being recovered by distillation; each of the mixture components being usable directly as insecticides as well as in the production of auxiliary components for use in the manufacture of synthetic resins and of plant protective agents.

---

The present invention relates to a process for the preparation of a mixture of N-chlorocarbonyl-isocyanide dichloride and carbonyl-bis-(N-isocyanide dichloride), and the corresponding thio compounds, by reacting cyanogen chloride with phosgene or thiophosgene.

It is already known that certain particularly activated acyl chlorides can be readily added to cyanogen chloride at 50° C./5 excess atmospheres in the absence of a catalyst to form an acyl isocyanide dichloride. However, compounds decompose even at room temperature under normal pressure to reform the starting components. At elevated temperatures, this equilibrium shifts completely to the side of the decomposition products owing to trimerisation of cyanogen chloride.

It has now been found that N-chlorocarbonyl isocyanide dichloride is obtained together with carbonyl-bis-(N-isocyanide dichloride) or the corresponding thio compounds if cyanogen chloride is reacted in the absence of Lewis acids with a compound of the formula

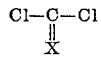

in which X represents an oxygen or sulphur atom, at a temperature of from 100 to 300° C., if desired in the presence of an inert solvent and if desired in the presence of an inert gas, under elevated pressure in the presence of active charcoal, the isocyanide dichlorides formed being removed by distillation if desired.

The process according to the invention is carried out at a temperature range of from 100 to 300° C., preferably at a temperature of from 120° C. to 150° C. It is carried out under an elevated pressure, preferably of 5 to 100 excess atmospheres, more preferably 10 to 40 excess atmospheres.

Solvents which may be optionally used in the process include, in particular, chlorinated hydrocarbons such as methylene dichloride, chloroform, carbon tetrachloride, chlorobenzene, dichlorobenzene and hexachloroethane. If the process is carried out in the presence of an inert gas, a suitable inert gas which may be used is carbon dioxide, alternatively in particular nitrogen. Commercially available active charcoals may be used in the process according to the invention, for example the types mentioned in Ullmanns Enzyklopädie der Technischen Chemie, 3rd Edition, or those mentioned by Kirk Othmer.

The compounds which can be obtained by the process according to the invention correspond to the general formula

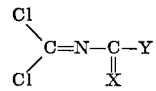

in which X represents an oxygen or sulphur atom and Y represents a chlorine atom (I) or the radical

The new type compounds include isocyanide dichlorides of the formula

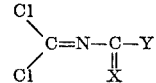

in which X is oxygen or sulfur, and Y is the radical

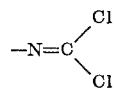

with the proviso that when X is sulfur, Y also may be chloro.

In order to increase the proportion of I, phosgene or thiophosgene is used in at least the stoichiometrically required quantity in the reaction, and preferably in excess; a molar excess of 2 to 10 and preferably 3 to 5 is generally used. In order to increase the proportion of compound II formed in the reaction, an excess of cyanogen chloride is employed in an analogous manner. The reaction is advantageously carried out especially in the latter case in the presence of one of the above mentioned inert organic solvents.

It is particularly surprising that the process according to the invention leads to the production in high yield of the above mentioned new types of compounds, and that trimerisation of cyanogen chloride to the easily separated cyanuric chloride, which would have been expected, takes place only to a relatively slight extent. The process may be carried out either batchwise or continuously, and the products may be worked up in the usual manner. In contrast to the acyl isocyanide dichlorides mentioned above, the new compounds are thermally stable and can easily be separated from each other by distillation.

The new types of compounds which can be obtained by the process according to the invention can be used in the same way in further reactions which are typical of isocyanide dichlorides which are already known. Furthermore, they may be used in the production of auxiliary components for use in the manufacture of synthetic resins and of plant protective agents. They may also be used directly as plant protective agents.

Furthermore, the compounds according to the invention may be used as insecticides. Thus, for example, they are 100% lethal to mosquitoes within one hour when employed at a concentration of 0.01% and within three hours when employed at a concentration of 0.001%.

The compounds are 100% lethal to flies within 8 hours, if the compounds are employed at a concentration of 0.01%.

In all the above-mentioned cases the effective compound can be applied either dissolved in an indifferent organic solvent as chlorinated and/or fluorinated lower aliphatic hydrocarbons as methylene chloride, difluorochloromethane or as a powder (silicagel) i.e. mixed with an inert inorganic extender. As the artisan will appreciate, the compounds are applied (alone or in admixture with a solvent or inert inorganic extender) to an insect habitat or, of course, to the corresponding insects themselves.

In order that the invention may be fully understood, the following examples are given by way of illustration only:

EXAMPLE 1

1065 g. (10.75 mol) of phosgene were distilled in a glass insert for a three litre autoclave with the exclusion of moisture, and are then heated together with 132 g. (2.15 mol) of cyanogen chloride and 10 g. of active charcoal at 120° C. for 5 hours in the 3 l. autoclave under an initial pressure of 10 excess atmospheres of nitrogen, the pressure gradually increasing to 30 excess atmospheres. After cooling, the pressure was released through a cooling trap and unreacted phosgene and cyanogen chloride were distilled off by slight heating on a water bath. The cyanuric chloride which was formed at the same time in small quantities crystallised almost quantitatively from the cold reaction product and was separated by filtration. The filtrate was subjected to fractional vacuum distillation.

Conversion: 50%
Yield: 101 g. (71% of the theoretical (of N-chlorocarbonylisocyanide dichloride of B.P. 35° C./20 mm. Hg; 30 g. (21% of the theoretical) of carbonyl-bis(N-isocyanide dichloride) of B.P. 90 C./15 mm. Hg and 11.5 g. (8% of the theoretical) of cyanuric chloride.

EXAMPLE 2

568 g. (5.64 mol) of phosgene and 694 g. (11.3 mol) of cyanogen chloride were reacted together and worked up under the same conditions as described in Example 1.

Conversion 35%.
Yield: 229 g. (59.2% of the theoretical) of carbonyl-bis-(N-isocyanide dichloride); 52 g. (13.4% of the theoretical) of N-chlorocarbonyl-isocyanide dichloride and 106 g. (27.4% of the theoretical) of cyanuric chloride.

What we claim is:
1. Process for the preparation of a mixture of N-chlorocarobnyl-isocyanide dichloride and carbonyl-bis-(N-isocyanide dichloride) which comprises reacting cyanogen chloride in the absence of Lewis acids with phosgene at a temperature of from 100 to 300° C. under elevated pressure of between 5–100 excess atmospheres and in the presence of active charcoal.
2. Process according to claim 1 wherein cyanogen chloride is reacted with phosgene in the presence of an inert gas.
3. Process according to claim 1 wherein the reaction is carried out in the presence of an inert solvent.
4. Process according to claim 3 wherein said solvent is a halogenated hydrocarbon.
5. Process according to claim 3 wherein an excess of cyanogen chloride is used.
6. Process according to claim 2 wherein said inert gas is selected from the group consisting of carbon dioxide and nitrogen.
7. Process according to claim 1 wherein the reaction is carried out at a temperature between 120–150° C.
8. Process according to claim 1 wherein a 2–10 molar excess of phosgene over the cyanogen chloride is used.
9. Process according to claim 1 wherein the desired product mixture is recovered by distillation of the resulting reaction mixture.

References Cited

UNITED STATES PATENTS 3,312,697   4/1967   Rietmann et al. _____ 260—248

FOREIGN PATENTS 633,232   10/1963   Belgium.

LEON ZITVER, Primary Examiner

M. W. GLYNN, Assistant Examiner

U.S. Cl. X.R.

260—552, 553, 248; 424—315, 322